United States Patent [19]

Jenkins et al.

[11] Patent Number: 4,470,111
[45] Date of Patent: Sep. 4, 1984

[54] PRIORITY INTERRUPT CONTROLLER

[75] Inventors: Alfred D. Jenkins; William E. Heaton, both of Cambridge, Ohio

[73] Assignee: NCR Corporation, Dayton, Ohio

[21] Appl. No.: 320,783

[22] Filed: Nov. 12, 1981

Related U.S. Application Data

[63] Continuation of Ser. No. 80,621, Oct. 1, 1979, abandoned.

[51] Int. Cl.³ .............................................. G06F 9/18
[52] U.S. Cl. .................................................. 364/200
[58] Field of Search ............................... 364/200, 900

[56] References Cited

U.S. PATENT DOCUMENTS

| | | | |
|---|---|---|---|
| 3,833,888 | 9/1974 | Stafford et al. | 364/200 |
| 3,939,453 | 2/1976 | Schroeder | 364/900 |
| 3,947,824 | 3/1976 | Doehle et al. | 364/900 |
| 3,949,368 | 4/1976 | West | 364/200 |
| 3,949,369 | 4/1976 | Churchill | 364/200 |
| 3,967,246 | 6/1976 | House | 364/200 |
| 4,004,283 | 1/1977 | Bennett et al. | 364/200 |
| 4,028,664 | 6/1977 | Monahan et al. | 364/200 |
| 4,034,349 | 7/1977 | Monaco et al. | 364/200 |
| 4,056,847 | 11/1977 | Marcantonio | 364/200 |
| 4,091,447 | 5/1978 | Dillion | 364/200 |
| 4,096,571 | 6/1978 | Vander Mey | 364/200 |
| 4,103,330 | 7/1978 | Thacker, Jr. | 364/200 |
| 4,181,941 | 1/1980 | Godsey | 364/200 |
| 4,291,371 | 9/1981 | Holtey | 364/200 |

OTHER PUBLICATIONS

Intel, *The 8080/8085 Microprocessor Book*, 1980, pp. 140–146 and pp. 220–223.

Primary Examiner—Eddie P. Chan
Assistant Examiner—Daniel K. Dorsey
Attorney, Agent, or Firm—J. T. Cavender; Wilbert Hawk, Jr.; Richard W. Lavin

[57] ABSTRACT

An interrupt control unit which couples a plurality of peripheral devices to a central processor includes a counter for outputting signals for monitoring a plurality of encoders each coupled to a number of peripheral devices, each encoder outputting the address of a requesting peripheral device when enabled. A memory unit outputs the address of the highest priority peripheral device for each output signal of the counter and a comparator compares the address of the peripheral device having the highest priority access outputted by the memory unit with the address of the previously interrupting peripheral device to determine priority access to the central processor.

14 Claims, 7 Drawing Figures

PRIORITY INTERRUPT CONTROLLER

This application is a continuation of application Ser. No. 080,621, filed Oct. 1, 1979, now abandoned.

BACKGROUND OF THE INVENTION

The present invention is directed to a data processing system in which a plurality of data terminal devices are in communication with a host processor and more particularly, to a priority interrupt controller for processing interrupting messages from the terminal devices in accordance with a predetermined priority level arrangement.

Present data processing systems have included a central or a host processor and a plurality of data handling peripheral devices which are connected to the host processor for the purpose of exchanging information with the host processor. Since each of the peripheral devices operates independently of each other, conflicts can arise between a plurality of peripheral devices in trying to gain access to the host processor. The most common solution to this problem is to assign a priority level of access to each of the peripheral devices in which a peripheral device having a higher priority level will always gain access to the host processor over a peripheral device having a lower priority level when both devices are trying to gain access to the host processor at the same time. Examples of this type of arrangement can be found in U.S. Pat. Nos. 4,056,847 and 4,034,349, which are representative of priority interrupt controllers employed in prior art processing systems. One disadvantage of the priority systems found in the prior art is that the priority levels thus assigned prevent any reassignment of the priority levels without a reconfiguration of the priority circuits. In those situations when priority levels are required to be changed several times throughout the day, the prior art priority controllers are incapable of meeting this requirement, especially where cost is a factor. It is therefore an object of the present invention to provide a low cost, priority interrupt controller which can select various priority level arrangements for a plurality of remote data terminal devices when accessing a host processor. It is a further object of this invention to provide a low cost, priority interrupt controller which will continuously seek the highest priority terminal device requesting access to the host processor during a processing operation.

SUMMARY OF THE INVENTION

In order to fulfill these objects, there is provided a priority interrupt controller which includes a random access memory unit (RAM) which outputs the address of a group of terminals having the highest priority level in accordance with one of a plurality of priority level arrangements stored in the memory unit in response to receiving the address of the interrupting terminal device. The RAM unit is enabled by data signal received from a microprocessor to store one of a plurality of priority level arrangements for processing the interrupts generated by the terminal devices. The address outputted from the RAM is compared to the address of the previous interrupting group of terminal devices to determine if the interrupt generated by the current interrupting terminal device should be given access to the microprocessor. The address of the interrupting terminal device is compared with the previous highest priority terminal device to provide a continuous updating of the highest priority interrupt that is present in the system.

BRIEF DESCRIPTION OF THE DRAWINGS

Additional advantages and features of the present invention will become apparent and fully understood from a reading of the following description taken together with the annexed drawings.

FIGS. 4A and 4B taken together show a detailed block diagram of another portion of the priority interrupt controller in accordance with the present invention;

DESCRIPTION OF THE PREFERRED EMBODIMENT

Figure 1:
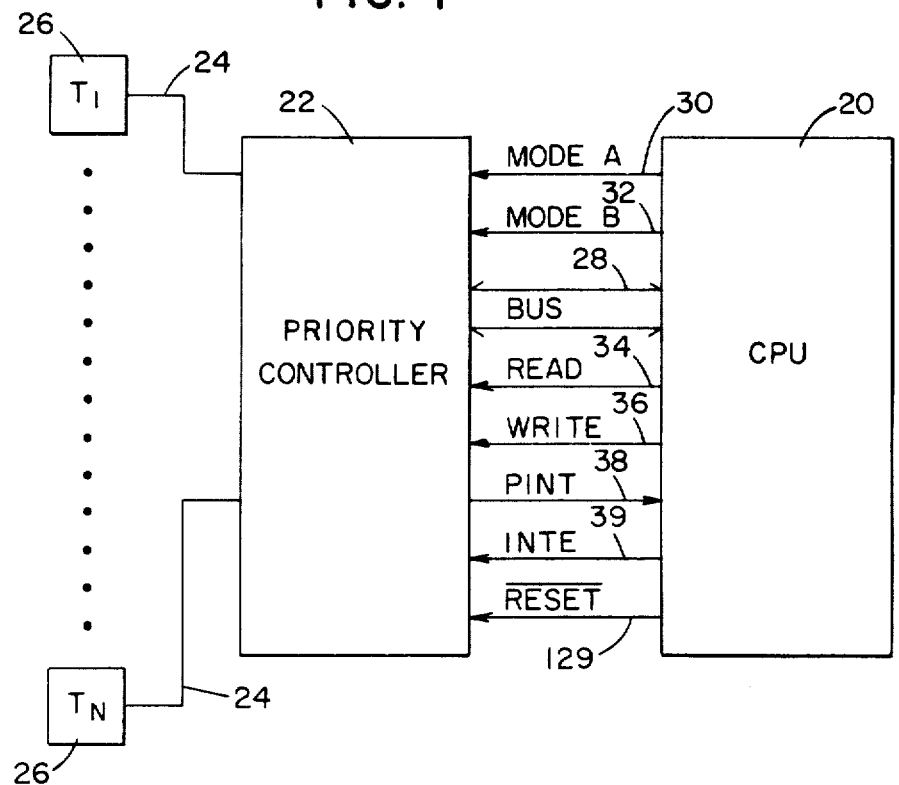
FIG. 1 is a simplified block diagram of a data processing system in which the priority interrupt controller is constructed in accordance with the principles of the present invention.
Figure 2:
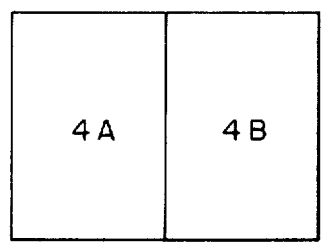
FIG. 2 is a diagrammatic representation of how

Referring now to FIG. 1, there is shown a data processing system which includes a host central processor unit (CPU) 20 which may comprise an Intel 8080 Microprocessor and a priority interrupt controller 22 connected over lines 24 to a predetermined number of remote peripheral devices 26, such as data terminals $T_1$-$T_N$ inclusive. The lines 24 may, for purposes of illustration, be of common bus construction. The controller 22 communicates with the CPU 20 over a common bus 28 in addition to lines 30-39 inclusive over which control signals MODE A, MODE B, READ, WRITE, PINT, and INTE together with the control signal $\overline{\text{RESET}}$ on line 129 are transmitted between the controller 22 and the CPU 20 for purposes which will be described more fully hereinafter. In the present example, the controller 22 is arranged to communicate with 64 data terminal devices 26.

Figure 3:
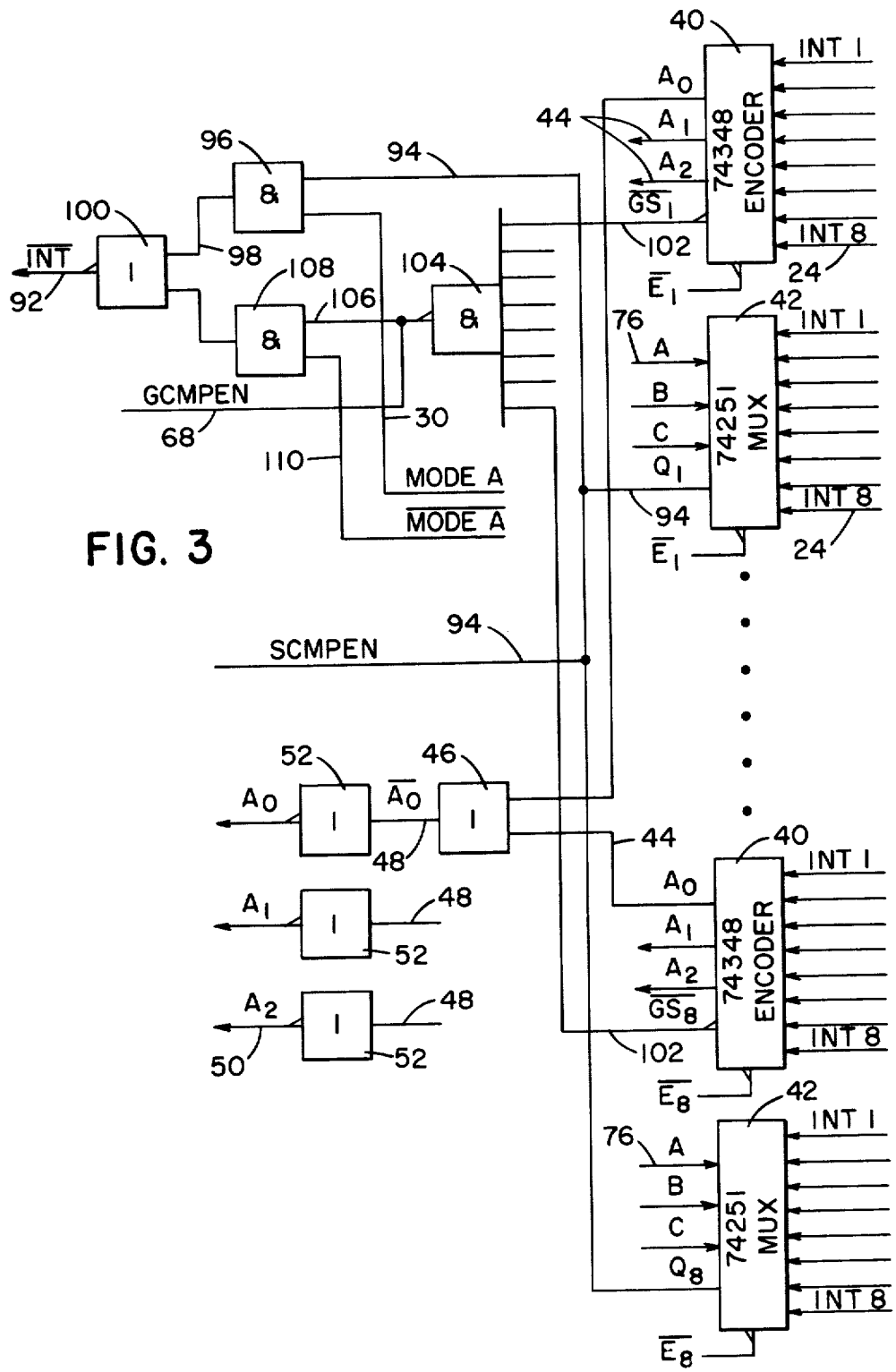
FIG. 3 shows a detailed block diagram of a portion of the priority interrupt controller in accordance with the present invention.

Referring now to FIG. 3, there is shown a portion of the interrupt controller 22 (FIG. 1) which includes eight priority encoders 40 of which two are shown in detail. Each of the encoders 40 is coupled over the lines 24 to eight of the remote terminal devices 26 (FIG. 1). Associated with each of the encoders 40 is a multiplexer 42 which is coupled to the remove terminal devices 26 over the same lines 24 that are connected to its associated encoder. As will be obvious in this construction, the same signal generated by one of the remote terminal devices 26 will appear on the corresponding lines 24 to the encoder 40 and its associated multiplexer 42. The encoder 40 may comprise a #74348 encoder while the multiplexer 42 may be part #74251, which are both commercially available from the Texas Instruments Corporation, Dallas, Tex.

In a manner that is well-known in the art, a requesting one of the terminal devices 26 (FIG. 1) will raise one of a number of interrupt signal INT1-INT8 inclusive (FIG. 3) over lines 24 to one of the encoders 40 and its associated multiplexer 42, resulting in the encoder 40 outputting over lines 44 a 3-bit binary word $\overline{A_0}$, $\overline{A_1}$, and $\overline{A_2}$ comprising the address of the requesting or interrupting terminal 26. Each of the corresponding output lines 44 of the encoders 40 is inputted into an OR gate 46 whose output line 48 is coupled to an inverter 52. In a similar manner, each of the other output lines 44 of the encoders 40 is coupled to similar inverters 52 such that the three binary bit address $A_0$–$A_2$ inclusive will appear on the output line 50 of the inverters 52. As will be described more fully hereinafter, the address bits $A_0$–$A_2$ inclusive of the interrupting terminal 26 appearing on lines 50 will be transmitted to a comparator 134 (FIG. 4A) which compares the address of the previous interrupting terminal 26 to determine if the current interrupting terminal 26 has a higher priority than that of the previous interrupting terminal. If it is found to have a higher priority the current interrupting terminal will be given access to the microprocessor.

Figure 5:
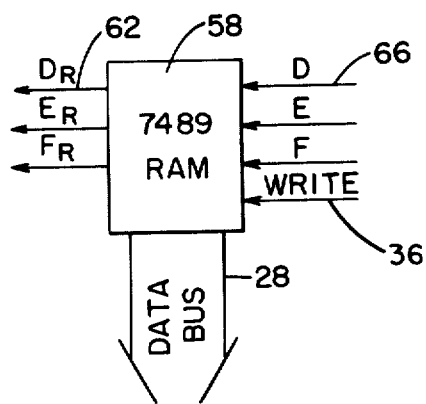
FIG. 5 is a detailed block diagram of a portion of the priority interrupt controller showing the RAM unit which controls the interrupt priority level currently assigned to the interrupt controller.

Referring now to FIG. 5, there is shown another portion of the interrupt controller 22 (FIG. 1), which includes a #7489 Random Access Memory unit (RAM) 58 which is programmed to provide one of a number of different priority level arrangements with respect to the encoders 40. The required priority level arrangements are written into the RAM unit 58 over the data bus 28 under the control of the signal $\overline{WRITE}$ transmitted over line 36 from the CPU 20. In accordance with the priority level arrangement stored in the RAM unit 58, the CPU 20 will output the control signal MODE A and MODE B at the signal levels shown in Table I. If, during the operation of the data processing system, it is desired to alter the priority level arrangement presently existing in the system, the new priority level arrangement is stored in the RAM unit 58 and the signal level of the control signals MODE A, MODE B are changed accordingly.

TABLE I

| LEVEL ARRANGE-MENT | MODE A | MODE B | GROUP PRIORITY | SUB-GROUP PRIORITY |
|---|---|---|---|---|
| 1 | 0 | 0 | 0 | 1 |
| 2 | 1 | 0 | 0 | 0 |
| 3 | 0 | 1 | 1 | 1 |
| 4 | 1 | 1 | 1 | 0 |

As shown in the accompanying Table I, any one of four priority level arrangements can be selected in accordance with the signal level of the control signals MODE A, MODE B. The heading GROUP PRIORITY shown in such Table I refers to the encoders 40 (FIG. 3) while the heading SUB-GROUP PRIORITY refers to the remote terminal devices 26 (FIG. 1) coupled to each of the encoders 40. Thus, if the control signals MODE A and MODE B are both logic zero, the priority level would be applied to any of the remote terminal devices 26 coupled to any of the encoders 40 while if the control signal MODE A is a logic zero while the control signal MODE B is a binary 1, priority would be applied to both the encoders 40 and to the remote terminal devices 26 coupled to each of the encoders 40.

As will be explained more fully hereinafter, the RAM 58 (FIG. 5) receives a three bit binary word DEF over lines 66 from the counter 54 (FIG. 4A) representing the address of one of the encoders 40 (FIG. 3). In response to receiving the address bits DEF, the RAM 58 will output on its output lines 62 a three bit binary address $D_R$, $E_R$, $F_R$ representing the address of the encoder having the highest priority in accordance with the priority level arrangement stored at that time in the RAM 58. The address bits $D_R$, $E_R$, $F_R$ appearing on lines 62 are transmitted to a comparator 136 (FIG. 4A) which also receives the three bit address D'E'F' over lines 132 from a latch 124 (FIG. 4A) representing the address of that one of the encoders 40 (FIG. 3) whose terminal device had the previous interrupt. Upon finding the address bits appearing on lines 62 equal to or greater than the address bits appearing on lines 132—thus indicating that the address bits being outputted by the counter 54 represent the address of the highest priority encoder, the comparator 136 will output signals over lines 138 or 140 to a multiplexer 70 (FIG. 4B) for use in selecting the highest priority terminal 26 attempting to gain access to the CPU 20.

Figure 4A:
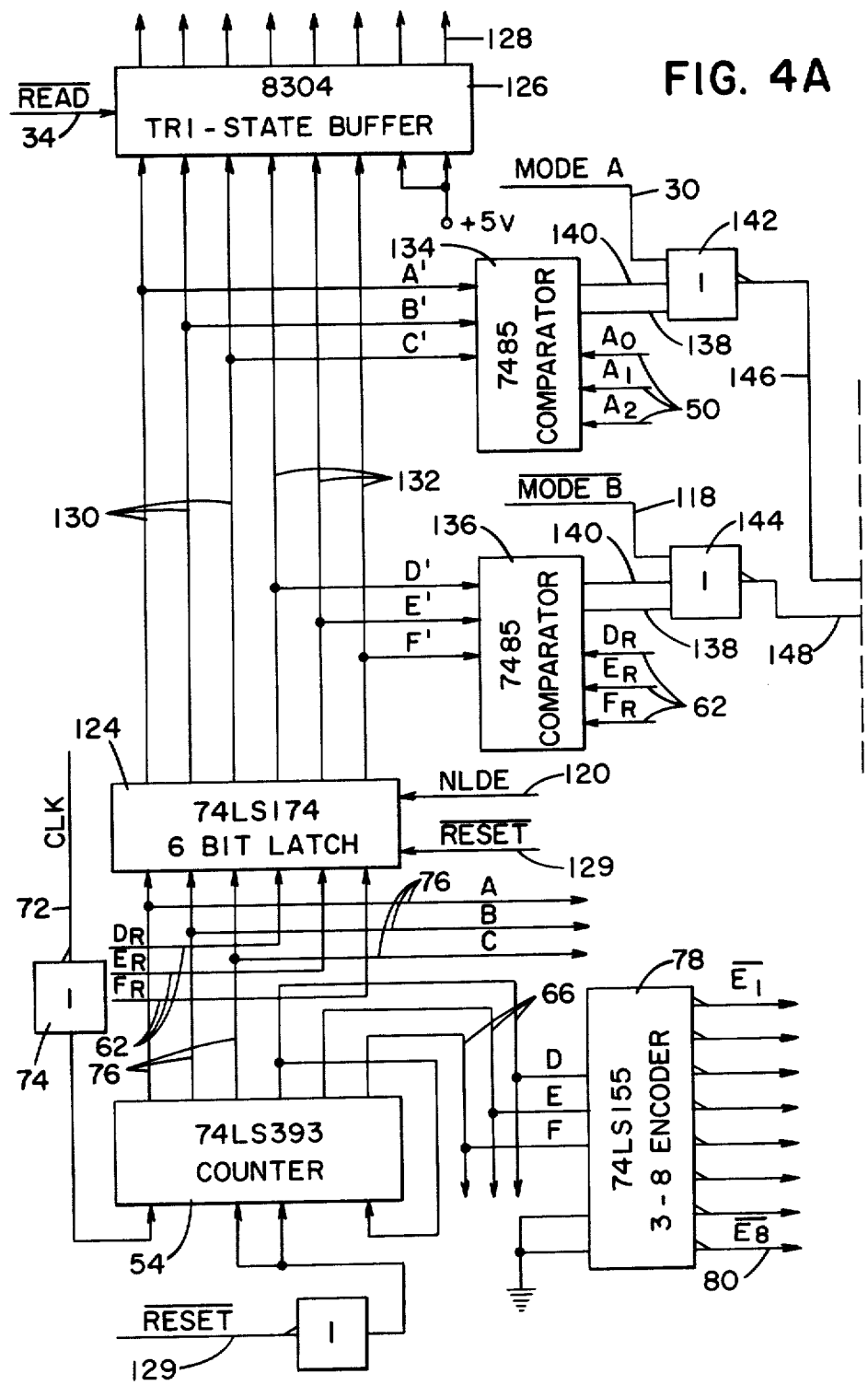
FIGS. 4A and 4B are arranged.
Figure 4B:
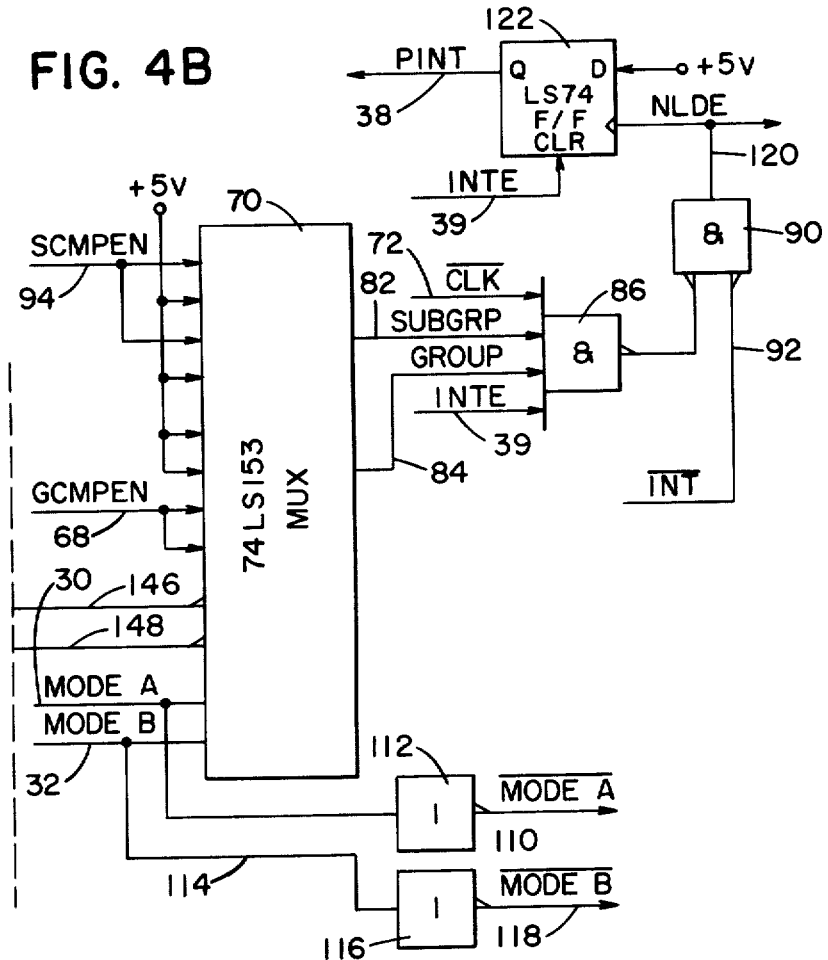

Referring now to FIGS. 4A and 4B taken together, there is shown in block form a portion of the priority controller 22 (FIG. 1). Included in the controller is the #74LS393 6-bit counter 54 (FIG. 4A) enabled by clock signals $\overline{CLK}$ which are generated by an oscillator (not shown) and transmitted over line 72 and through the inverter 74 to the counter 54. The counter 54 will output over lines 76 the three bit count ABC representing the address of one of the remote terminal devices 26 (FIG. 1). In the present embodiment, the counter 54 will output the counts 0–7 inclusive, each representing the address of one of the remote terminal devices 26 coupled to each of the encoders 40 (FIG. 3). Upon reaching the count of 7, the counter 54 will increment the three bit count DEF outputted over lines 66 and representing the address of one of the encoders 40. The count DEF will also count through 0–7 inclusive. Thus, the counter 54 will output a count ABC over lines 76 representing the address of one of the interrupt lines 24 (FIG. 3) while the address bits DEF of one of the encoders 40 will also appear on the output lines 66 during the time the count 0–7 appears on the output lines 76. It will thus be seen that the output count of the counter 54 will scan through the address of each of the encoders 40 and their interrupt lines 24.

As shown in FIG. 4A, the address bits DEF outputted over lines 66 from the counter 54 and representing the address of each of the encoders 40 are transmitted to a #74LS155 3-8 encoder 78 which will monitor the encoders 40 for an interrupting terminal device 26 by outputting in sequence over its output lines 80 one of the enabling signal $\overline{E_1}$–$\overline{E_8}$ inclusive representing the encoder 40 whose address bits DEF appear on the input lines 66 at that time. As shown in FIG. 3, the enabling signals $\overline{E_1}$–$\overline{E_8}$ inclusive are transmitted to each of the encoders 40 and its associated multiplexer 42, enabling the encoders to output over its output lines 44 the address bits $\overline{A_0}$–$\overline{A_2}$ representing the address of the interrupting remote terminal device 26 which has raised an interrupt signal over one of the interrupt lines 24. As previously described, the address bits $\overline{A_0}$–$\overline{A_2}$ are inverted by the inverters 52 and transmitted to the comparator 134 on whose other input appears the three bit address A'B'C' appearing on lines 130 and latched in a 6 bit latch 124 (FIG. 4A) representing the address of the previous interrupting terminal.

Appearing on the input lines 76 of the multiplexers 42 (FIG. 3) will be the three bit address ABC outputted by the counter 54 (FIG. 4A). When the three bit address ABC appearing on lines 76 represents the address of the interrupting data terminal device which has raised one of the signals INT1-INT8 over line 24 to the multiplexer 42, the multiplexer 42, when enabled by one of the signals $\overline{E_1}$-$\overline{E_8}$, will raise one of the control signals $Q_1$-$Q_8$ inclusive over line 94. As shown in FIG. 3, the line 94 is coupled to each of the multiplexers 42. Upon the raising of any of the signals $Q_1$-$Q_8$ inclusive, the signal will appear as the control signal SCMPEN on line 94 and will be transmitted over line 94 to the multiplexer 70 (FIG. 4B) enabling the multiplexer in a manner to be described more fully hereinafter.

The signals $Q_1$-$Q_8$ inclusive are also transmitted over line 94 to one input of an AND gate 96 (FIG. 3) on whose other input is present the control signal MODE A which is transmitted over line 30 from the processor 20 (FIG. 1). As seen from Table I, the signal MODE A is high when there is no priority level assigned to any of the terminal devices 26. Upon receiving one of the signals $Q_1$-$Q_8$ inclusive, the AND gate 96 will output a high signal over line 98 to one input of a NOR gate 100 whose The other input receives a signal generated in the following manner. As shown in FIG. 3, upon the enabling of one of the encoders 40 by one of the signals $\overline{E_1}$-$\overline{E_8}$, the encoder 40 will output one of the low signals $\overline{GS_1}$-$\overline{GS_8}$ when one of the interrupt signals INT1-INT8 appearing on one of its lines 24 has been raised. The signal $\overline{GS_1}$ is outputted over line 102 to one input of a NAND gate 104 whose other inputs are coupled to the remaining encoders 40 over lines 102. Since at this time, each of the remaining signals $\overline{GS}$ are high, the NAND gate 104 will output a high signal over line 106 which appears as the control signal GCMPEN on line 68 and to one input of an AND gate 108 which also receives at its other input over line 110 the low control signal $\overline{\text{MODE A}}$. The signal $\overline{\text{MODE A}}$ is outputted from an inverter 112 (FIG. 4B) which is coupled to the input line 30 of the multiplexer 70. In a similar fashion, the control signal MODE B appearing on line 32 and coupled to the multiplexer 70 is also transmitted over line 114 to the inverter 116 whose output signal $\overline{\text{MODE B}}$ will appear on line 118 for use in a manner to be described more fully hereinafter.

If at this time the signal $\overline{\text{MODE A}}$ is low, the AND gate 108 will output a high signal to the NOR gate 100 which, upon receiving the high signal from the AND gate 96 in the manner described previously, will output the low interrupt signal $\overline{\text{INT}}$ over line 92 to the AND gate 90 (FIG. 4B) which receives a low signal in a manner that will now be described.

Upon the raising of the control signals SCMPEN appearing on line 56 and GCMPEN appearing on line 68 representing the identification of the interrupting terminal 26 and its corresponding encoder 40 together with the signals generated by the comparators 134 and 136 (FIG. 4A) over lines 138 and 140, the multiplexer 70 will raise the Sub-Group signal SUBGRP over line 82 and the Group signal GROUP over line 84 to an AND gate 86 in accordance with the results shown in Table I. At this time, the AND gate 86 is also receiving the inverter clock signal $\overline{\text{CLK}}$ over line 72 from the oscillator (not shown) and the interrupt signal INTE appearing on line 39 and raised by the CPU 20 (FIG. 1) during the time that the controller 22 is enabled to transmit an interrupt signal to the CPU 20. Upon the $\overline{\text{CLK}}$ signal going high, the NAND gate 86 will output a low signal to an inverting input of the AND gate 90.

The AND gate 90, upon receiving two low input signals, will output the high control signal NLDE over line 120 through the clock input of a LS74 flip-flop 122, thereby toggling the flip-flop resulting in the appearance at the Q output of the flip-flop the high processing interrupt signal PINT which is transmitted over line 38 to the CPU 20 (FIG. 1) notifying the CPU of the interrupt condition of the controller 22.

The raising of the control signal NLDE over line 120 is also transmitted to the 6-bit latch 124 (FIG. 4A) enabling the latch to store the output of the counter 54. As described previously, the output count of the counter 54 at this time includes the address bits ABC of the interrupting terminal 26 (FIG. 1) together with the address bits DEF of the encoder 40 (FIG. 3) to which the interrupting terminal is coupled. Upon receiving the interrupt signal PINT, the CPU 20 will output the signal $\overline{\text{READ}}$ over line 34 to a #8304 tri-state buffer 126 (FIG. 4A) which at this time has stored therein the output of the 6-bit latch 124 representing the address of the interrupting terminal device and its corresponding encoder having the highest priority level. This data is then transmitted over lines 128 which are a part of the bus 28 (FIG. 1) to the CPU 20. The CPU 20 upon receiving the data over the bus 28 will be vectored into an interrupt routine which processes the interrupt signals in a manner that is well-known in the art. Once the output of the buffer 126 has been read by the CPU 20, the CPU will lower the signal $\overline{\text{RESET}}$ over line 129 resetting the latch 124 and the counter 54 (FIG. 4A) together with the signal INTE which clears the flip-flop 122 (FIG. 4B) disabling the generation of any interrupt signals until the processor has serviced the existing interrupt.

As shown in FIG. 4A, the output lines 130 and 132 of the 6-bit latch 124 are inputted into a pair of #7485 comparators 134 and 136. As described previously, the comparator 134 receives the 3-bit address A'B'C' of the interrupting terminal stored in the latch 124 representing the address of the interrupting terminal having the highest priority access at this time. The comparitor 134 will also receive over lines 50 the address bits $A_0$-$A_2$ inclusive of subsequent interrupting terminal. If the address of the two terminals is equal signifying equal priority, a high signal will appear on the output line 138 of the comparator 134, while if the address bits appearing on lines 50 is greater than the address bits appearing on line 130, a high signal will appear on the output line 140. As shown in FIG. 4A, the output lines 138 and 140 of the comparator 134 are coupled to a NOR gate 142 which also receives over line 30 the instruction signal MODE A transmitted from the processor 20 in a manner described previously. In a similar manner, the comparator 136 will compare the address D', E', F' of the encoder 40 (FIG. 3) stored in the latch 124 with the address of the encoder having the highest priority appearing on lines 62 and outputted from the RAM unit 58 (FIG. 5). If the addresses are equal, a high signal will appear on line 138 while if the address outputted by the RAM 58 is greater than the address stored in the latch 124, a high signal will appear on line 140 connected to the comparator 136. The output lines 138 and 140 of the comparator 136 are connected to a NOR gate 144 which also receives on its input lines 30 the control signal MODE B and which NOR gate 144 is similar to the operation of the NOR gate 142. As previously described, the signals MODE A or $\overline{\text{MODE B}}$ are used to control the signal level appearing on the output lines 146 and 148 of the NOR gates 142 and 144 respectively.

The output line 146 of the NOR gate 142 and the output line 148 of the NOR gate 144 are connected to the multiplexer 70 (FIG. 4B) and will, together with signals SCMPEN, GCMPEN, MODE A AND MODE B, control the outputting of the signals SUBGRP and GROUP over lines 82 and 84 to the NAND gate 86 in the manner disclosed in Table I. It will be assumed that when two terminal devices 26 (FIG. 1) are requesting access to the processor 20 at the same time, the controller 22 will process each terminal device individually. Thus, after the first interrupting terminal device has been processed, its address A'B'C', together with the address D'E'F' of its associated encoder 40, will appear on the output of the latch 124 (FIG. 4A) to be compared with the address of the second interrupting terminal device 26 and its associated encoder 40 whose addresses are being outputted by the counter 54. If the second interrupting terminal device has a priority level equal to or greater than the previous or first interrupting terminal device 26, the multiplexer 70 will output the appropriate control signals SUBGRP and GROUP in a manner previously described enabling the AND gate 90 to output the interrupting signal NLDE over line 120 resulting in the generation of the processor interrupt signal PINT over line 38 and the processing of the second interrupting terminal whose address is now stored in the latch 124 as a result of the generation of the signal NLDE. If the second interrupting terminal has a priority less than the first interrupting terminal whose address is stored in the latch 124, the multiplexer 70 is disabled from outputting the control signals SUBGRP and GROUP to the NAND gate 86 and the processing of the first interrupting terminal will continue under the control of the processor 20. The controller 22 at this time will continue processing the interrupts generated by the terminal devices 26 over the interrupt lines 24 (FIG. 3) until the second interrupting terminal device has a priority equal to or greater than the previous interrupting terminal device. The integrated circuits disclosed in the blocks in FIGS. 3, 4A and 4B, and FIG. 5 are commercially available from the Texas Instruments Corporation of Dallas, Tex.

Figure 6:
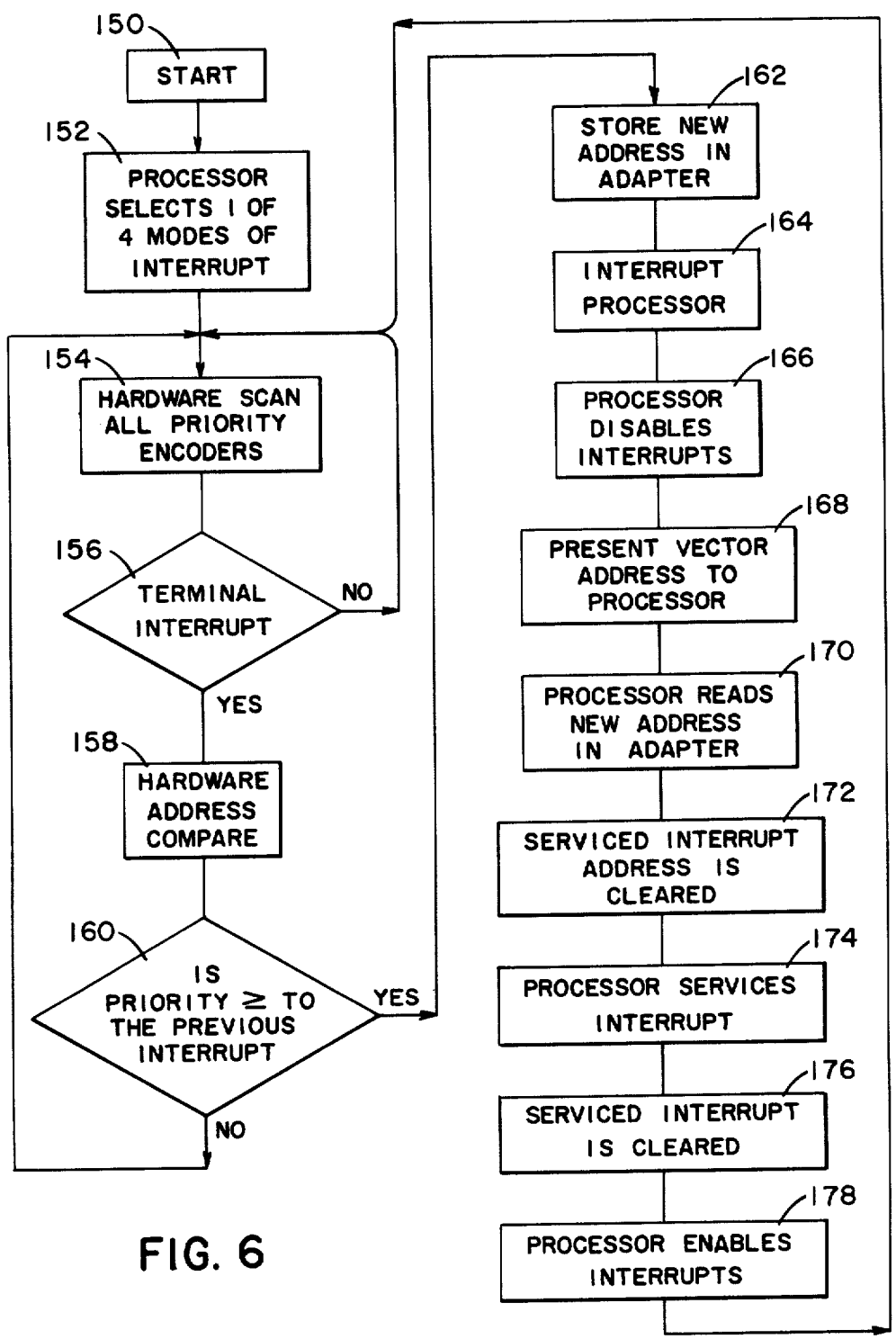
FIG. 6 is a flowchart of the operation of the interrupt controller in processing interrupting messages from the plurality of remote data terminal devices.

Referring now to FIG. 6, there is disclosed a flowchart of the operation of the controller 22 and the CPU 20 (FIG. 1) upon the generation of one of the interrupt signals INT1–INT8 inclusive (FIG. 3) by one of the data terminal devices 26. At the start of an interrupt operation (block 150), the CPU 20 will have outputted the levels of the signals MODE and MODE B over lines 30 and 32 to the multiplexer 70 (FIG. 3B) and have selected (block 152) one of the priority level arrangements as disclosed in Table I for storage in the RAM 58 (FIG. 5). During the start of the operation, the counter 54 (FIG. 4A) will begin outputting a 6-bit count representing the address of the encoder 40 (FIG. 3) and its associated terminal device 26 (FIG. 1) resulting in the encoder 78 (FIG. 4A) outputting one of the scanning signals $\overline{E_1}-\overline{E_8}$ to each of the priority encoders 40, thereby scanning the encoders (block 154) to see if one of the interrupt signals INT1–INTA8 has been raised by any of the remote terminal devices. This condition will continue until one of the encoders 40 and its associated multiplexer 42 outputs (block 156) the appropriate signals $\overline{GS1}$, $Q_1$ together with the output signal GCMPEN outputted from the NAND gate 104 (FIG. 3) and the signal SCMPEN generated by the associated multiplexer 42. The address of the interrupting terminal 26 and the encoder 40 is then compared (block 158) with the address of the previous interrupting terminal device 26 and its associated priority encoder 40 by the comparators 134 and 136 (FIG. 4A) to determine if the priority level of the current interrupting terminal device is equal to or greater than the priority level of the previous interrupting terminal device (block 160). If the priority level is not equal to or greater than the priority level of the previous interrupting terminal device, the system will continue the scanning of the priority encoders (block 154) for an interrupting terminal device which has a priority level greater than the previous interrupting terminal device, which normally occurs when the interrupt of the previous terminal is processed by the processor and the latch 124 is cleared by the signal RESET as described previously. Once a higher priority interrupting terminal device 26 is found, the multiplexer 70 is enabled to output the appropriate control signals SUBGRP and GROUP resulting in the raising of the control signal NLDE, which signal results in the storing of the address of the interrupting terminal device and its associated priority encoder 40 in the latch 124 (block 162) together with the generation of the processor interrupt signal PINT over line 38 (FIG. 4B) to the CPU 20 (FIG. 1), thereby interrupting the operation of the CPU (block 164).

In response to receiving the signal PINT, the processor 20 will lower the interrupt signal INTE over line 39 to the clear input of the flip-flop 122, thereby clearing the flip-flop and disabling the control signal PINT (block 166). The processor 20 (FIG. 1) will then generate the $\overline{READ}$ signal over line 34 to the tri-state buffer 126 (FIG. 4A), thereby reading the address of the interrupting terminal device 26 (block 168 and 170) which address is transmitted to the processor.

In response to receiving the address of the interrupting terminal device, the processor will clear the address of the previously serviced interrupt (block 172) and process the new interrupt in accordance with the subroutine stored in the memory of the microprocessor (block 174). The processor then clears the interrupt (block 176) at the conclusion of the interrupt operation, and thereafter will raise the signal INTE enabling (block 178) the NAND gate 86 (FIG. 4B) and the flip-flop 122 to generate a new interrupt signal PINT upon the occurrence of the next interrupt by the highest priority terminal device 26 as determined by the signals MODE A and MODE B together with the priority level stored in the RAM unit 58 (FIG. 5).

It will be seen from the description just presented that the controller 22 (FIG. 1) provides an interrupt system whose priority level can be readily changed by altering the program in the RAM 50 (FIG. 5). Since the generation of the interrupt signal PINT to the processor 20 is dependent upon the output of the comparators 134 and 136 (FIG. 4A), the system will be continuously comparing the priority level of the current interrupting terminal device 26 with the previous interrupting terminal device 26 thereby ensuring that the address available to be transmitted to the processor will be that of the highest priority level interrupting terminal device.

While the invention has been particularly shown and described with reference to a preferred embodiment thereof, it will be understood by those skilled in the art that various changes in forms and details may be made therein without departing from the spirit and scope of the invention. Hence, applicants desire their invention not to be limited beyond the scope as required by the appended claims.

What is claimed is:

1. A priority interrupt controller coupled between a plurality of peripheral devices each having an address representing a priority of access level and a central processor in which the control processor outputs a priority level arrangement for its peripheral devices and associated priority selection signals identifying the priority level arrangement, wherein the controller generates an interrupt signal to the processor in response to the raising of a request signal by one of the peripheral devices, comprising:

a plurality of receiving means each connected to a group of said peripheral devices for receiving a request signal from one of said peripheral devices, said receiving means outputting the address of the requesting peripheral device when enabled;

counter means for outputting a count having a first portion representing the address of one of said receiving means;

encoding means connected to said counter means and said receiving means for outputting an enabling signal to one of said receiving means in response to receiving the first portion of the count corresponding to the address of said receiving means;

memory means connected to said central processor and said counter means for outputting one of a plurality of priority level arrangements for each of the receiving means in accordance with a priority level arrangement transmitted from the central processor and stored in the memory means, said memory means adapted to output the address of the highest priority receiving means according to the priority level arrangement stored in the memory means in response to receiving the first portion of the count from said counter means;

means for storing the addresses of the previous interrupting peripheral device and its associated receiving means;

first comparator means coupled to said storing means and said enabled receiving means for comparing the address of the requesting peripheral device outputted by said enabled receiving means with the address of the previous interrupting peripheral device outputted by said storing means, said first comparator means outputting a first control signal identifying the highest priority peripheral device;

second comparator means connected to said storing means and said memory means for comparing the address of the receiving means associated with the previous requesting peripheral device with the address of the highest priority receiving means outputted by said memory means, said second comparator means outputting a second control signal identifying the highest priority receiving means;

and control means connected to said first and second comparator means and said central processor, said control means receiving said first and second control signals and said selecting signals for generating an interrupt signal to said central processor upon said first and second comparator means finding the priority level of the interrupting priority device and its associated receiving means equal to or greater than the priority level of the previous interrupting peripheral device and its associated receiving means.

2. The controller of claim 1 in which said storing means is coupled to said counter means for storing the address of an interrupting peripheral device in response to the generation of said interrupt signal, said first and second comparator means outputting said first and second control signals to said control means when the address of the subsequently interrupting peripheral device and its associated receiving means is equal to or greater than the address of the stored peripheral device whereby said control means is enabled to generate said interrupt signal to the central processor enabling said storing means to store the address of the interrupting peripheral device.

3. The priority interrupt controller of claim 2 in which the count outputted by said counter means includes a second portion representing the address of one of the peripheral devices, the controller further includes a plurality of first multiplexer means each associated with one of said receiving means and coupled to a group of said peripheral devices, said receiving means and said first multiplexer means coupled to said counter means to output third and fourth control signals respectively in response to receiving the second portion of the output count of the counter equalling the address of a requesting peripheral device, said control means further includes second multiplexer means coupled to said receiving means, said comparator means and said first multiplexer means for outputting a fifth control signal in response to the generation of said first, second, third and fourth control signals, said fifth control signals enabling said control means to output said interrupt signal to the processor when the interrupting peripheral device has the highest priority level.

4. The priority interrupt controller of claim 1 in which said memory means comprises a dynamic random access memory unit.

5. The priority interrupt controller of claim 3 in which said receiving means outputs a sixth control signal upon the generation of a request signal by one of said peripheral devices, said control means further includes first logic means coupled to said second multiplexer for outputting said interrupt signal when enabled and said controller further includes second logic means coupled to said first logic means and said receiving means for outputting a seventh control signal to said first logic means upon the generation of said sixth control signal whereby said first logic means outputs said interrupt signal in response to receiving said third control signal.

6. In a data processing system for transmitting data between a central processor and a plurality of data terminal devices each having a request line for signalling the central processor of a request service wherein the processor outputs one of a plurality of priority level arrangements for the terminal devices together with a plurality of selecting signals for identifying the priority level arrangement, a controller coupled to the request lines of the terminal devices and the central processor for generating an interrupt signal to the central processor in response to the raising of a request signal over one of said request lines by one of said data terminal devices, comprising:

a plurality of first encoding means each connected to the request lines of a plurality of terminal devices for receiving the request signal of a requesting terminal device, said encoding means adapted to output the address of the requesting terminal device when enabled;

a plurality of second encoding means each associated with one of said first encoding means and connected to the request lines of the same terminal devices as that of its associated first encoding means, said second encoding means adapted to output a first control signal in response to receiving a request signal when enabled;

counter means connected to said second encoding means for outputting a count having a first portion representing the address of a terminal device and a second portion representing the address of one of said first encoding means connected to the terminal device, said first portion further representing the priority level of the terminal device;

third encoding means connected to the output of said counter means and each of said first and second encoding means for sequentially outputting an enabling signal to each of said first and second encoding means in response to receiving the second portion of the output count of said counter means whereby said first encoding means outputs the address of the requesting terminal device and said second encoding means outputs said first control signal;

memory means having stored therein one of a plurality of priority level arrangements for each of the terminal devices, said memory means connected to said central processor for receiving the priority level arrangement and the selecting signals, said memory means further connected to said counter means for receiving the second portion of said output count for outputting the address of the highest priority first encoding means for each output count received in accordance with the priority level arrangement stored in said memory means;

storage means coupled to said counter means and said central processor for storing the addresses of the previous interrupting terminal device and its associated first encoding means when enabled;

first comparison means connected to said storage means and the first encoding means enabled by said enabling signal for comparing the address of the requesting terminal device with the address of the previous interrupting terminal device, said comparison means outputting a second control signal upon finding the requesting terminal has a priority level equal to or greater than the priority level of the previous interrupting terminal device;

second comparison means connected to said storage means and said memory means for comparing the address of the first encoding means associated with the requesting terminal device and the output address of said memory means, said second comparison means outputting a third control signal identifying the highest priority first encoding means;

and control means coupled to said first and second comparison means, said second encoding means and said central processor for outputting an interrupt signal to said central processor in response to receiving said first, second and third control signals together with said selecting signals whereby the central processor will enable the storage means to store the address of the highest priority terminal device and its associated first encoding means.

7. The controller of claim 6 in which said control means includes a first multiplexer means coupled to said first and second comparison means and said processor for enabling said control means to output said interrupt signal in response to receiving said second and third control signals.

8. The controller of claim 7 in which said second encoding means comprises a second multiplexer means coupled to a predetermined number of terminal devices, said second multiplexer means coupled to said counter means for receiving the first portion of the output count of the counter for outputting said first control signal to said first multiplexer means upon finding a comparison between the address of an interrupting terminal device and the first portion of the output count of the counter whereby said first multiplexer means enables said control means to output said interrupt signal.

9. The controller of claim 8 in which each of said first encoding means is coupled to said first multiplexer means and adapted to output a fourth control signal to said first multiplexer means upon the raising of a request signal by a connected terminal device whereby said first multiplexer means enables said control means to output said interrupt signal.

10. The controller of claim 7 in which said central processor is coupled to said memory means for selectively storing in said memory means one of a plurality level arrangements for the terminal devices.

11. The controller of claim 10 in which said memory means comprises a dynamic random access memory.

12. The controller of claim 10 in which said first comparison means outputs said second control signals to said first multiplexer means enabling the control means to output said interrupt signal when the priority level of the current interrupting terminal device is equal to or greater than the priority level of the previous interrupting terminal device.

13. The controller of claim 12 in which said second comparison means outputs said third control signals to said first multiplexer means enabling the control means to output said interrupt signal when the address of the current interrupting terminal device is equal to or greater than the address of the previous interrupting terminal device.

14. The priority controller of claim 13 in which each of said first and second encoding means outputs a fifth control signal upon the generation of a request signal by one of its connected terminal devices, said control means further includes a first logic means coupled to said first multiplexer for outputting said interrupt signal when enabled and second logic means coupled to said first logic means and said first and second encoding means for outputting an enabling signal to said first logic means and said storage means upon the generation of said fifth control signal whereby said first logic means outputs said interrupt signal in response to receiving said enabling signal and said storage means stores the output of said counter means representing the address of the terminal device gaining access to said central processor.

* * * * *